United States Patent
Byszio (10) Patent No.: US 10,050,944 B2
(45) Date of Patent: Aug. 14, 2018

(54) PROCESS TO ACCESS A DATA STORAGE DEVICE OF A CLOUD COMPUTER SYSTEM WITH THE HELP OF A MODIFIED DOMAIN NAME SYSTEM (DNS)

(71) Applicant: Bundesdruckerei GmbH, Berlin (DE)

(72) Inventor: Frank Byszio, Wandlitz (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 253 days.

(21) Appl. No.: 15/100,724

(22) PCT Filed: Oct. 27, 2014

(86) PCT No.: PCT/EP2014/073006
§ 371 (c)(1),
(2) Date: Jul. 12, 2016

(87) PCT Pub. No.: WO2015/082133
PCT Pub. Date: Jun. 11, 2015

(65) Prior Publication Data
US 2016/0315915 A1  Oct. 27, 2016

(30) Foreign Application Priority Data

Dec. 5, 2013  (DE) .................. 10 2013 225 016

(51) Int. Cl.
*H04L 29/06* (2006.01)
*H04L 29/08* (2006.01)
*H04L 29/12* (2006.01)

(52) U.S. Cl.
CPC ...... *H04L 63/0428* (2013.01); *H04L 61/1511* (2013.01); *H04L 63/0272* (2013.01);
(Continued)

(58) Field of Classification Search
CPC ............ H04L 63/0428; H04L 61/1511; H04L 63/0272; H04L 63/06; H04L 67/10
See application file for complete search history.

(56) References Cited

U.S. PATENT DOCUMENTS 5,777,989 A * 7/1998 McGarvey ........ H04L 29/12066
370/254
8,966,625 B1 * 2/2015 Zuk ....................... H04L 63/145
709/227

(Continued)

OTHER PUBLICATIONS

International Search Report PCT/ISA/210 for International Application No. PCT/EP2014/073006 dated Feb. 6, 2016.

(Continued)

*Primary Examiner* — Wasika Nipa
(74) *Attorney, Agent, or Firm* — Harness, Dickey & Pierce, P.L.C.

(57) ABSTRACT

A process for accessing a data storage device of a CCS through a GCS includes setting up a protected connection over the Internet between a first piece of terminal equipment of the user and the GCS by inputting the URL of the CCS into a program of the piece of terminal equipment, and using the modified DNS for name resolution of the URL, so that the protected connection is set up with the GCS instead of with the CCS; transferring a file over the protected connection from the terminal equipment to the GCS; setting up a session over the network between the GCS and the CCS; encrypting the file by the gateway computer system using the cryptographic key; transferring the encrypted file through the session from the GCS to the CCS; and storing the encrypted file in the data storage device of the CCS.

9 Claims, 4 Drawing Sheets

(52) U.S. Cl.
CPC .......... *H04L 63/0435* (2013.01); *H04L 63/06* (2013.01); *H04L 63/083* (2013.01); *H04L 63/166* (2013.01); *H04L 67/1097* (2013.01)

(56) References Cited

U.S. PATENT DOCUMENTS

| | | | | |
|---|---|---|---|---|
| 9,021,085 | B1* | 4/2015 | Jensen | H04L 51/12 709/219 |
| 2004/0133688 | A1* | 7/2004 | Takamatsu | H04L 61/1511 709/228 |
| 2011/0246765 | A1 | 10/2011 | Schibuk | |
| 2013/0031356 | A1 | 1/2013 | Prince et al. | |
| 2013/0166637 | A1* | 6/2013 | Jungck | H04L 29/12066 709/203 |

OTHER PUBLICATIONS

Written Opinion of the International Searching Authority PCT/ISA/237 for International Application No. PCT/EP2014/073006 dated Feb. 6, 2016.

Karsten; "own-cloud-Zugriff per VPN über das Internet Teil I-Die Welt und ich-zugriff-per-vpn-uber-das-in", Jul. 18, 2013, retrived from the internet htp://www.kussaw.de/2013/owncloud-zugriff=per-vpn-uber-das-internet-teil-i/.

Donnerdrummel: "Die Owncloud 5 Encryption App", Jul. 16, 2013, retrived from the internet https://donnerdrummel.wordpress.com/2013/07/16/die-owncloud-5-encryption-app/.

Anonymous: "Howto", Jul. 17, 2013, retrived from the internet http://openvpn.net/index.php/open-source/documentation/howto.html.

Michael Gapczynski: core/dropbox.js at 5b50bc8c0aaa294bc982deea626e6d1d303c1c23.owncloud/core. Feb. 26, 2013, retrived from the internet https://github.com/owncloud/core/blob/5b50bc8c0aaa294bc982deea626e6d1d303c1c23/apps/files_external/js/dropbox.js.

"Owncloud", Dec. 2, 2013, http://en.flossmanuals.net_booki/owncloud/owncloud.pdf.

International Preliminary Report dated Jun. 16, 2016.

M.P. Lin t al., "Design and Implementation of Multi-user Secure Indices for Encrypted Cloud Storage," Eleventh Annual Conference on Privacy, Security and Trust (PST), DOI: 10.1109/PST.2013.6596052, URL: <http://ieeexplore.ieee.org/stamp/stamp.jsp?tp=&arnumber=6596052>, retrieved on Jul. 31, 2014, 2013, pp. 177-184.

X. Yu et al., Design of Security Solution to Mobile Cloud Storage, 2012, Springer-Verlag Berlin Heidelberg, H. Tan (ed.): Knowledge Discovery and Data Mining, URL: http://download.springer.com/static/pdf/157/chp%253A10.1007%252F978-3-642-27708-5_34/pdf?auth66=1406959255_871fcc7290c7a7bf30b33f65c6bb4362&ext=.pdf, retrieved on Jul. 31, 2014, pp. 255-263.

* cited by examiner

PROCESS TO ACCESS A DATA STORAGE DEVICE OF A CLOUD COMPUTER SYSTEM WITH THE HELP OF A MODIFIED DOMAIN NAME SYSTEM (DNS)

CROSS-REFERENCE TO RELATED APPLICATIONS

This application is a national phase under 35 U.S.C. § 371 of PCT International Application No. PCT/EP2014/073006 which has an International filing date of Oct. 27, 2014, which claims priority to German Patent Application No. 10 2013 225 016.9, filed Dec. 5, 2013, the entire contents of each of which are hereby incorporated by reference.

The invention relates to a process to access a data storage device of a cloud computer system, and a computer system.

The prior art discloses storing data in the so-called cloud in encrypted form. For example, at dropbox.com, files uploaded by the user into the cloud are stored using AES 256-bit encryption. The disadvantage of this is that the corresponding key is known to Dropbox, so that the confidentiality of the data is not ensured with respect to Dropbox.

Alternatively, the user can first encrypt, on his terminal equipment, a file that he wants to store in the cloud, and then upload the encrypted file from his terminal equipment into the cloud. In this case, the confidentiality of the file is also ensured with respect to the cloud provider, such as, for example Dropbox, since the cloud provider has no access to the key that the user used for encryption on his terminal equipment. However, this has the disadvantage that the user must keep the key with him in order to download the file back down from the cloud through different pieces of terminal equipment, and then decrypt it on the terminal equipment in question. Another disadvantage of this is that if the user wants to grant another user read permission to the file, he must communicate to this other user his secret key to decrypt the file, which presents an inherent security risk.

Therefore, the invention has the goal of creating an improved process to access a data storage device on a cloud computer system, and a corresponding computer system.

Here the abbreviation "URL" is understood to mean Uniform Resource Locator, which identifies a resource, such as, for example a computer system in a network, especially the Internet, especially in accordance with the standard RFC 1738.

Here a "Domain Name System" is understood to be a service in a network, especially an IP-based network, especially the Internet, this service being responsible for responding to name resolution requests. For example, a Domain Name System converts a computer's domain name into the associated IP address of the same computer. This service is also called "forward lookup".

Here a "cloud computer system" is understood to be a computer system with a data storage device, it being possible for the computer system to be accessed through a network, such as, for example, the Internet.

Here a "gateway computer system" is understood to be a computer system that can direct a storage command or a read command over a network to a cloud computer system, to store a file in the data storage device of the cloud computer system or to read it from the data storage device.

Here "terminal equipment" is understood to be a computer system with a network interface, especially a personal computer, laptop, notebook, tablet, or another mobile computer, a piece of telecommunications equipment, especially mobile telephony equipment, such as, for example, a smartphone or another network-capable device with a user interface.

Here a "network" is understood to be a communications network, especially a public network, such as, for example the Internet.

Here a "session" is understood to be a temporary communications link, that is, a so-called communication session, which can, in accordance with the OSI layer model, relate to the transport layer or the application layer. In particular, a session can be an http session or an https session, the transport layer being protected by symmetric encryption when the latter is used.

Here a "file directory" is understood to be a directory structure, a folder structure, or a directory tree that indicates file paths to stored files, and allows selection of a file path for a file to be stored.

Here a "VPN" is understood to be a Virtual Private Network that can be set up, for example, over a public network such as the Internet, for example. Typically, connection of the terminal equipment with the VPN presumes authentication of the user and/or of the terminal equipment with respect to the VPN. In particular, the terminal equipment can be connected to a VPN through a so-called VPN On Demand, which is supported, for example, in the Apple operating system iOS, cf. "Deploying iPhone and iPad; Virtual Private Networks", Apple Inc., 2012, or by starting a corresponding app, for example, on an Android operating system.

Here a "DNS server" is understood to be a Domain Name Server, that has, in a TCP/IP network, that is, for example, the Internet, the function of name resolution, that is, the association of an IP address with a URL, i.e., the so-called forward lookup.

Here an "APN" is understood to be an Access Point Name, that is, an access point of mobile telephony equipment, such as, for example a Smartphone, to a mobile telephony network. Typically, such an APN is preset in mobile telephony equipment.

According to one embodiment of the invention, a user stores a file in the cloud computer system as follows:

First, a protected connection is set up between a piece of terminal equipment of the user and a gateway computer system. Depending on the embodiment, this can be done according to the https protocol, through a VPN, or using another protocol.

The user then transfers a file from a piece of terminal equipment to the gateway computer system through the protected connection, to upload this file to the cloud computer system.

The gateway computer system then sets up a session with the cloud computer system.

Preferably, the gateway computer system authenticates the user with respect to the cloud computer system, by the gateway computer system accessing the user's authentication data stored in the gateway computer system, such as, for example a username/password combination, and using it for authentication with respect to the cloud computer system.

The gateway computer system then encrypts the file with a key. This key can be user-specific, and is stored by the gateway computer system. The key can be a symmetric key for the encryption and decryption of the file, or also an asymmetric cryptographic key pair, in which case the public key is used for the encryption and the private key is used for the decryption by the gateway computer system. Hybrid encryption of the file using both a symmetric and an asymmetric key pair is also possible. In this case, the gateway computer system generates a file-specific symmetric key for the file received from the terminal equipment of the user. The file is encrypted using this file-specific symmetric key. The user is associated with an asymmetric key pair, i.e., a private key of the user with the associated public key of the user. The file-specific symmetric key with which the file is encrypted is now itself encrypted with the public key of the user. The unencrypted file-specific symmetric key can then be deleted by the gateway computer system and does not need to be permanently stored there.

The gateway computer system transfers the encrypted file through the session to the cloud computer system, and stores it there. In the above-mentioned case of hybrid encryption, the file-specific symmetric key encrypted with the public key of the user is additionally transferred through the session to the cloud computer system and is stored there in association with the encrypted file, to allow the encrypted file and the associated encrypted file-specific symmetric key to be read at a later time.

The procedure for setting up the protected connection between the terminal equipment of the user and the gateway computer system is that the URL input into a program of the terminal equipment is not that of the gateway computer system, but rather that of the cloud computer system. The program can be a usual web browser or a special application program, that is, a so-called app, of the terminal equipment.

This program is designed to set up the protected connection as an Internet session, such as, for example an https session. The name resolution required to accomplish do this is carried out using a modified Domain Name Systems, which accomplishes this by associating the domain contained in the URL of the cloud computer system with the IP address of the gateway computer system. That is, the program's requirement for name resolution of the URL of the cloud computer system provides, as a Domain Name System response, the IP address of the gateway computer system, that is, so that the protected connection is really set up with the gateway computer system, not directly with the cloud computer system, although the URL of the cloud computer system was input into the program.

This has the special advantage that the user can, as usual, input the URL of the cloud computer system into the program, such as, for example his web browser, so that the user does not have to change his habits or enter the new URL of the gateway computer system into the program, or even know it.

Embodiments of the invention are especially advantageous since on the one hand the file is stored in the cloud computer system in encrypted form, without the cloud computer system having access to the user's key to decrypt the file, and on the other hand the user can access his files stored in the cloud computer system through the gateway, independent of the respective terminal equipment used, since the key(s) required for this purpose need not be present on the respective terminal equipment used. This provides the greatest flexibility, convenience, and security for storing files in the cloud.

According to one embodiment of the invention, the cloud computer system has a file directory to indicate a directory structure for the files that the user has stored in the data storage device of the cloud computer system. The gateway computer system has a replica of this file directory that is updated when a file is stored in the cloud computer system, in order to replicate it. To allow the user to navigate in the directory structure of the cloud computer system, which he does to pick the place where the file is saved, the following procedure can be used:

The gateway computer system produces a web page displaying the replica of the file directory.

This web page is transferred over the protected connection to the terminal equipment, and displayed, for example, by means of the terminal equipment's web browser.

The user then selects a file path on the basis of the file directory, to select a storage location for the file.

This storage location selected by the user, that is, the selected file path, is then transferred over the protected connection from the terminal equipment to the gateway computer system.

The gateway computer system generates a corresponding storage command for the cloud computer system, in order to store, through the session, the encrypted file in the storage location previously selected by the user in the data storage device of the cloud computer system.

After the encrypted file has been successfully stored, the cloud computer system responds with an acknowledgment signal indicating that that the storage was successful.

Following that, the gateway computer system updates the replica of the file directory, so that an icon for the previously stored file appears in the replica of the file directory.

According to one embodiment of the invention, so-called file sharing is allowed by the user inputting an identifier of another user in his terminal equipment and transferring this identifier over the protected connection to the gateway computer system. This identifier can be, for example, an e-mail address of the other user. File sharing can be done using the following procedure:

The user specifies access privileges of the other user to a certain file or multiple files that are stored for the user in the data storage device of the cloud computer system. These privileges can be specified using the replica of the file directory of the gateway computer system.

The gateway computer system stores the specification of the access privileges for the other user together with the identifier of the other user. For example, the specification of the access privileges can also be subject to a time limitation.

The gateway computer system produces a message such as, for example an e-mail, to inform the other user that he has been granted the access privileges. For example, the e-mail contains a URL, which the other user can select after receiving the e-mail on his terminal equipment, for example, by clicking with the mouse or by tapping the touch screen of his smartphone, after which the web browser of the terminal equipment is launched and a response to this e-mail is sent to the user's gateway computer system. Following that, a protected connection, such as, for example an https connection or a connection using VPN on Demand is set up between the gateway computer system and the terminal equipment of the other user, over which the other user is allowed, on the basis of the access privileges granted to him, read access, through the gateway computer system, to the user's files stored in the data storage device of the cloud computer system.

In the case of the above-mentioned embodiment with hybrid encryption, the access privileges for the other user specify that the gateway computer system is first granted read access to the cloud computer system in order to read the file-specific symmetric key that is associated with the file for which the access privileges are supposed to be granted, this file-specific symmetric key having been encrypted with the user's public key. This encrypted file-specific symmetric key is then decrypted by the gateway computer system using the private key of the user that wants to grant access privileges to the other user. This decrypted file-specific symmetric key is then encrypted with the public key of the other user, who is also associated with an asymmetric cryptographic key pair, and the gateway computer system stores the ciphertext resulting from this encryption in the cloud computer system, and does so in such a way that the ciphertext is also associated with the file. This allows the other user read access to the file.

According to one embodiment of the invention, the protected connection to upload the file from the terminal equipment is automatically set up with the gateway computer system, and not with the cloud computer system, although the user input the URL of the cloud computer system, for example, in his web browser.

According to one embodiment of the invention, this is implemented so that the DNS server that is specified in the operating system of the user's terminal equipment resolves the name of the cloud computer system, that is, its URL, not into the IP address of the cloud computer system, but rather into the IP address of the gateway computer system. Accordingly, the protected connection is set up not with the cloud computer system, but rather with the gateway computer system. For the user, this has the advantage that he can, as usual, input for example www.dropbox.com in his web browser, since this automatically connects him with the gateway computer system, without having to know or input the URL of the gateway computer system.

In an analogous manner, an APN of a mobile telephony network can be used to set up the secure connection with the gateway computer system rather than with the cloud computer system.

According to one embodiment of the invention, the terminal equipment has an association file stored on it that associates the domain contained in the URL of the cloud computer system with the IP address of the gateway computer system. The operating system of the terminal equipment is designed to process a request of the program for name resolution of a URL by first accessing the association file to check whether an association with an IP address for the URL in question is stored there. If this is the case, then the operating system answers the request of the program with this IP address of the association file. On the other hand, if the association file does not have a corresponding entry in it, then the operating system forwards the program's request to a DNS server. This DNS server can be specified in the operating system of the terminal equipment.

That is, the Domain Name System can be modified by having the association file of the terminal equipment store the association of the domain [contained in] the URL of the cloud computer system with the IP address of the gateway computer system. Alternatively, the Domain Name System can be modified by having this association stored not in the association file, but rather on the level of the DNS server, which can be specified in the operating system of the terminal equipment, for example, by storing the IP address of this predetermined DNS server in an operating system file.

Embodiments of the invention are especially advantageous, since storage of the association in the association file allows an individual association on the level of the individual pieces of terminal equipment. By contrast, this association can be specified on a global basis for multiple pieces of such terminal equipment through the reference to a predetermined DNS server on which this association is stored. If there is a global specification by storage on the DNS server, it is also possible to deviate, on the level of the terminal equipment, from this global specification by storing an association in the association file that is different from that on the DNS server, if for example the user wants a different gateway computer system and/or a different cloud computer system from that provided for the other pieces of terminal equipment.

Embodiments of the invention will be explained in detail below with reference to the drawings.

The figures are as follows.

Elements of the following embodiments that correspond to one another or are the same are always labeled with identical reference numbers.

Figure 1:
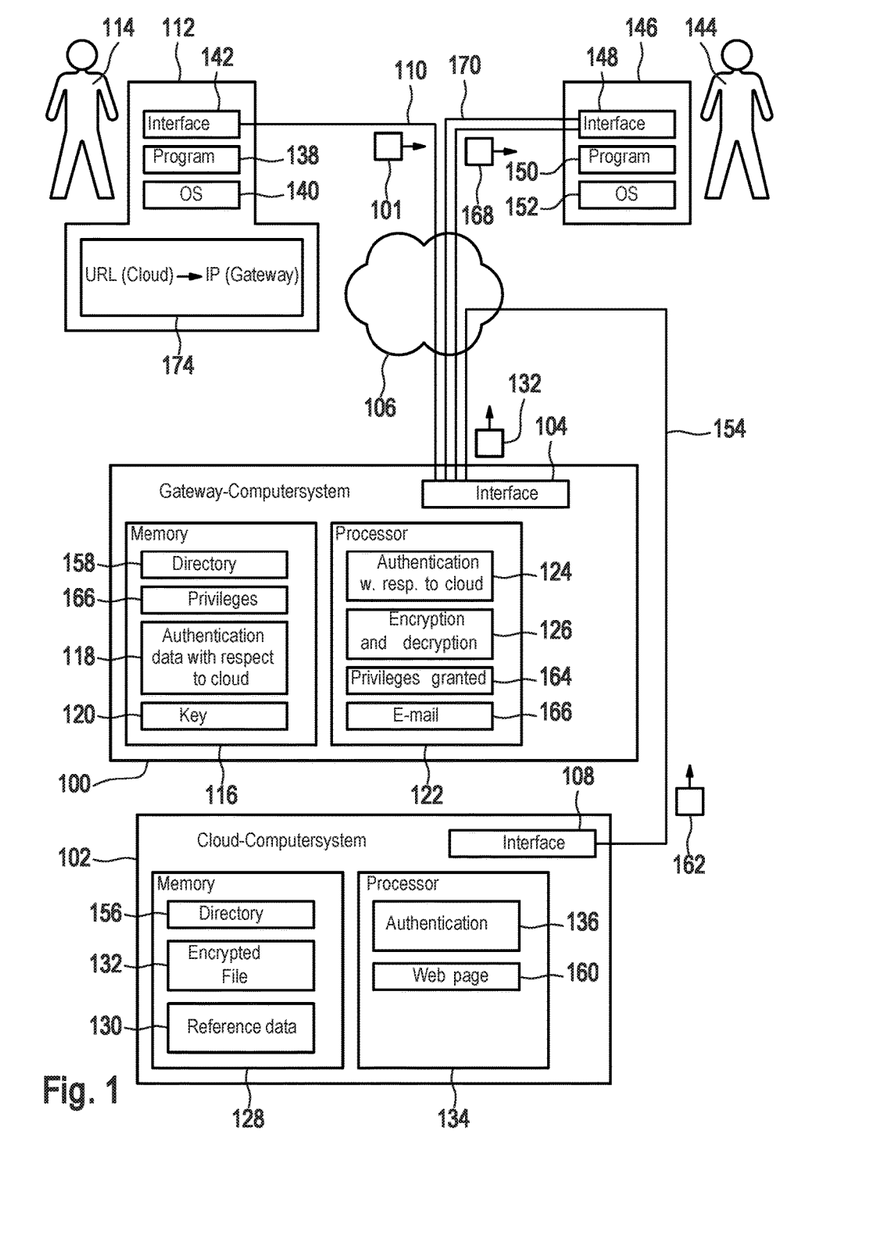
FIG. 1 A block diagram of an embodiment of an inventive computer system.

FIG. 1 shows a computer system that comprises a gateway computer system 100 and a cloud computer system 102. The gateway computer system 100 has an interface 104 for coupling with a network 106, which can be the Internet, for example. The cloud computer system 102 also has an interface 108 for coupling with the network 106, so that a session can be set up between the gateway computer system 100 and the cloud computer system 102.

The interface 104 of the gateway computer system 100 can also be used to set up a protected connection 110 with a piece of terminal equipment 112 of a user 114. For example, the protected connection 110 is also set up over the network 106. For example, the protected connection 110 is an https session, or the protected connection 110 is set up over a VPN that comprises the terminal equipment 112 and the gateway computer system 100.

The gateway computer system 100 has an electronic memory 116 that stores the authentication data of registered users, in particular the authentication data 118 of the user 114. This authentication data 118 is used to authenticate the user 114 with respect to the cloud computer system 112. The authentication data can comprise, for example, a user name/password combination.

The memory 116 also stores at least one cryptographic key for each registered user, in particular the symmetric key 120 for the user 114. Instead of a symmetric key, it is also possible for an asymmetric cryptographic key pair for a registered user to be stored in the memory 116.

The gateway computer system 100 has at least one microprocessor 122 to execute a program module 124 that authenticates a registered user with respect to the cloud computer system 102 and executes a program module 126 for encryption and decryption of files using the key for the respective user that is stored in the memory 116, in particular using the key 120 of the user 114.

The cloud computer system 102 has an electronic memory 128 that stores the reference data for authenticating the registered user, in particular the reference data 130 for the user 114. The memory 128 also stores encrypted files of the registered user, in particular the encrypted file 132, which is saved there for the user 114.

The cloud computer system 102 comprises at least one microprocessor 134 to execute a program module 136 for authenticating the registered user. The cloud computer system 102 can be a cloud computer system known from the prior art, such as, for example, dropbox.com. Such a cloud computer system 102 usually involves setting up, directly between the terminal equipment of the user and the cloud computer system 102, an Internet connection over which the user authenticates himself with respect to the cloud computer system, in order then to be able to upload files into the cloud computer system or to download previously stored files.

In contrast to this procedure known from the prior art, the inventive procedure involves the authentication of the registered user with respect to the cloud computer system being done not this user himself, but rather on his behalf by the gateway computer system 100, and this being done using the authentication data 118. This has the special advantage that implementing the invention allows access to existing cloud computer systems without this necessarily requiring a change.

The terminal equipment 112 of the user 114 can be a stationary or mobile computer system, especially a piece of telecommunications equipment, such as, for example, a smartphone. The terminal equipment 112 executes a program module 138, which can be, for example, a web browser or an application program, such as, for example, a so-called app.

The terminal equipment 112 also has an operating system 140, such as, for example, Windows, iOS, or Android, as well as an interface 142 to set up the protected connection 110 with the gateway computer system 100. The user 114 is a registered user who is registered in the gateway computer system 100 and in the cloud computer system 102.

The terminal equipment 112 has an association file 174 stored on it that associates the domain contained in the URL of the cloud computer system with the IP address of the gateway computer system 100. The operating system 140 of the terminal equipment 112 is designed to process a request of the program 138 for name resolution by first accessing the association file 174 to check whether an association of the domain in question with an IP address is stored in the association file 174. If this is the case, then the operating system 140 answers the request of the program 138 with this IP address stored in the association file. On the other hand, if the association file 174 does not have such an entry in it, then the operating system 140 forwards the request of the program 138 to a DNS server (compare DNS server 172 of the embodiment shown in FIG. 4).

In this case, the terminal equipment 112 is configured so that the domain contained in the URL of the cloud computer system 102 is associated, in the association file 174, with the IP address of the gateway computer system 100.

Another user 144 is not necessarily a registered user; the user 144 has a piece of terminal equipment 146, which can be a stationary or mobile computer or a piece of telecommunications equipment, such as, for example, a piece of mobile telephony equipment, especially a smartphone. The terminal equipment 146 has an interface 148 for connecting with the network 106, a program module 150 for receiving a message, such as, for example, an e-mail, and an operating system 152.

Figure 2:
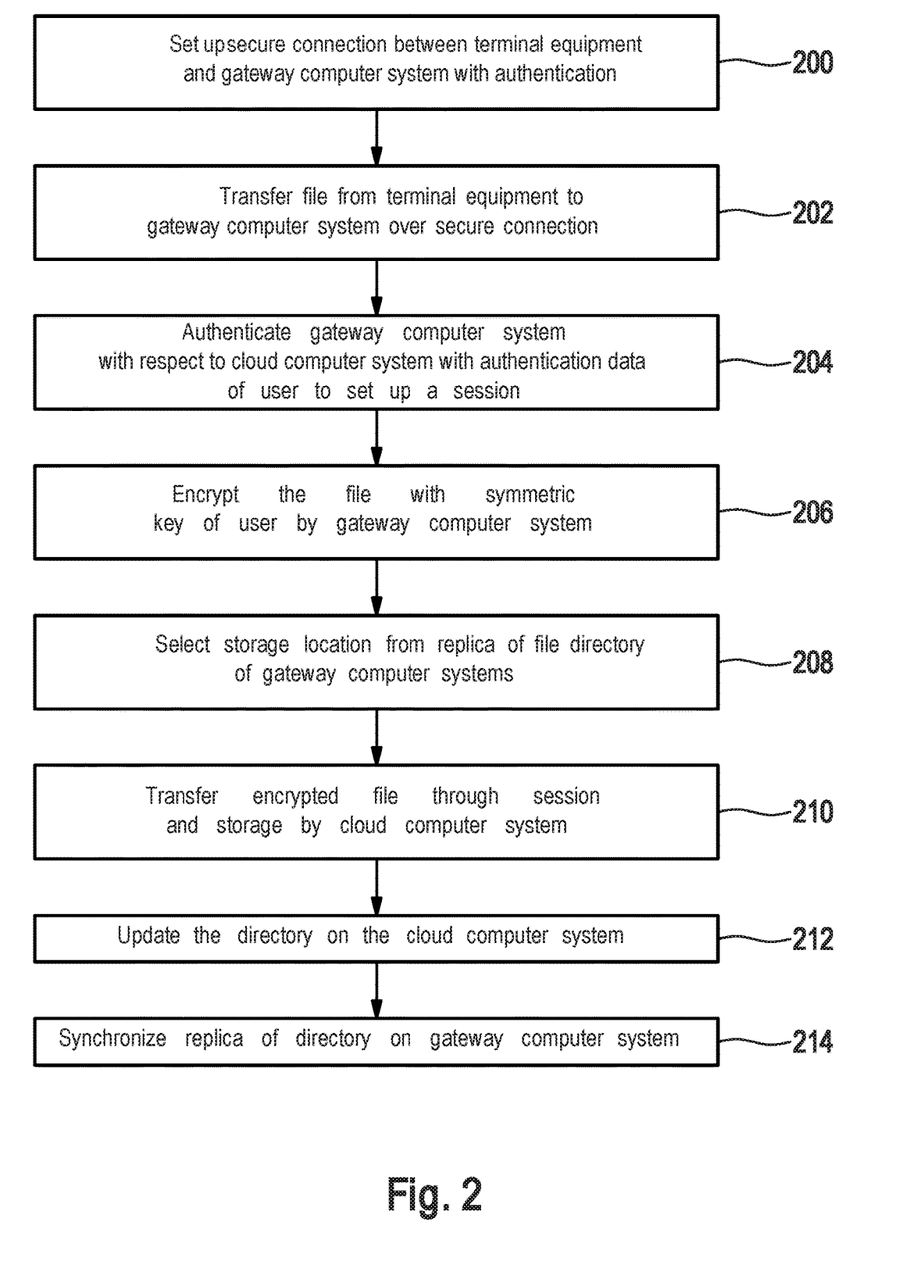
FIG. 2 A flow chart of an embodiment of an inventive process.
Figure 3:
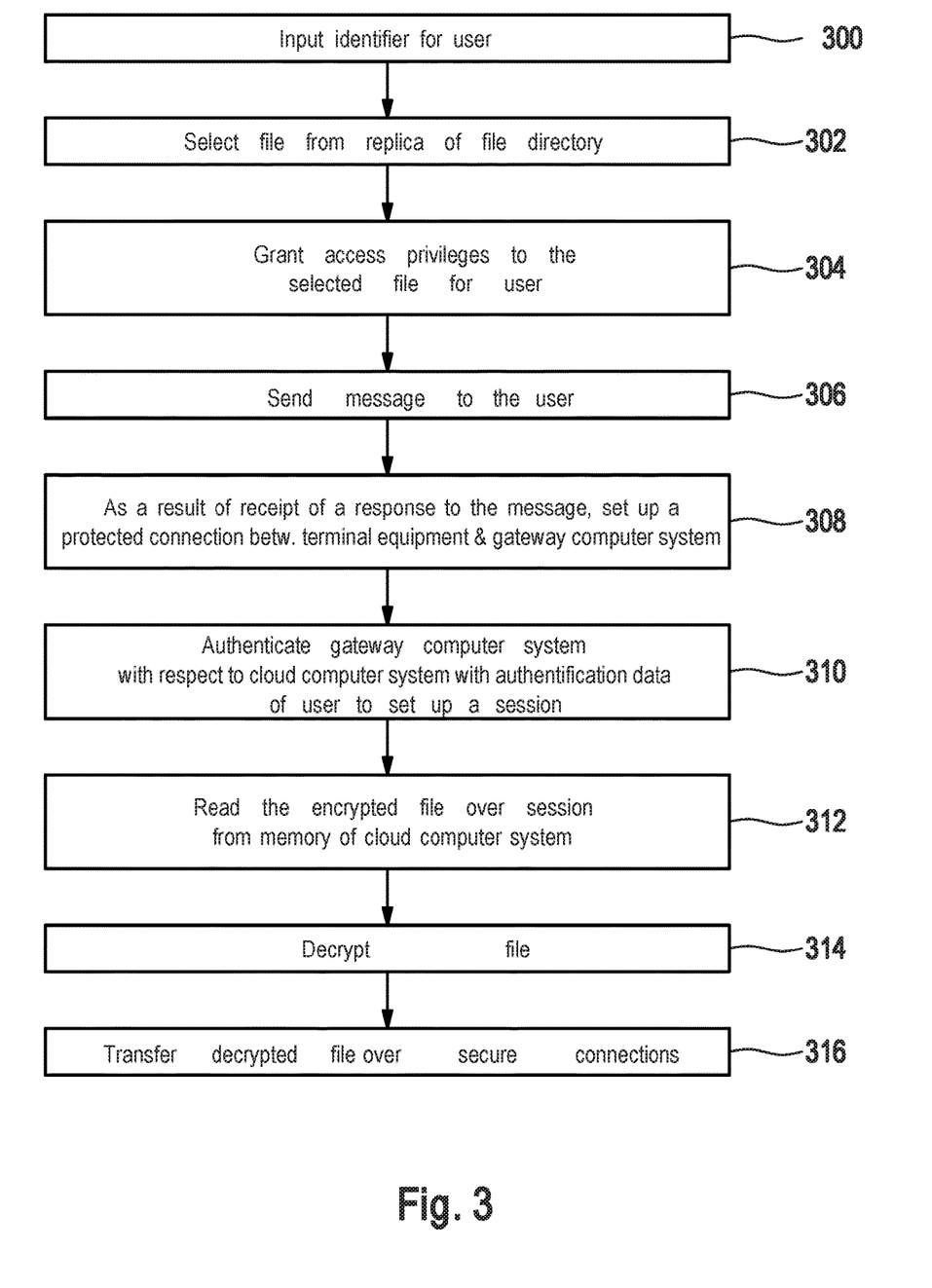
FIG. 3 A flow chart of another embodiment of an inventive process.

The operation of the computer system shown in FIG. 1 is explained in detail below on the basis of the flow charts shown in FIGS. 2 and 3:

In step 200, the secure connection 110 is set up between the terminal equipment 112 of the user 114 and the gateway computer system 100. Depending on the embodiment, this can necessitate authentication of the user 114 and/or the terminal equipment 112 with respect to the gateway computer system 100. If the protected connection 110 is achieved over a VPN, the user 114, for example, must authenticate himself for dialing in to the VPN using a one-time password (OTP). Another possibility is to set up the protected connection 110 by a so-called VPN on demand.

Alternatively, the protected connection 110 can be set up according to the https protocol, for example, by the user 112 inputting a URL of the gateway computer system 100 into the program module 138 to set up such an https connection, or by using a so-called redirect to forward the user 114 to such a URL of the gateway computer system 100, to set up the protected connection 110.

To set up the secure connection 110, the procedure is, for example, that the user 114 inputs the URL of the cloud computer system 102 into the program 138, especially when the program 138 is a web browser, or that the user 114 only launches the program 138, especially when it is a special app that already contains the URL of the cloud computer system 102, so that the user 114 need not explicitly input the URL.

The program 138 then generates a name resolution request for the URL of the cloud computer system 102. The operating system 140 processes this request by accessing the file 174. Since this file stores an association for the URL of the cloud computer system 102, that is, for the domain contained in it, the operating system 140 answers the program 138 with the IP address of the gateway computer system 100, so that the connection 110 is then set up between the terminal equipment 112 and the gateway computer system 100.

In step 202, a file 101 is transferred over the secure connection 110 from the terminal equipment 112 to the gateway computer system 100. The file 101 can be, for example, a photograph that the user 114 has taken using his terminal equipment 112, a Word file, an Excel file, or another file whose contents concern private or business matters of the user 114.

This file 101 can be transferred unencrypted over the protected connection 110, since the protected connection 110 provides sufficient security against snooping or manipulation of the file 101 on the transmission path from the terminal equipment 112 to the gateway computer system 100, i.e., the file need not necessarily be encrypted before being transferred over the connection 110, since the connection 110 is itself encrypted, e.g., on the transport layer. This has the advantage that the terminal equipment 112 does not need to have any special encryption software or cryptographic key on it, except for, e.g., a session key for the connection 110.

In step 204, because the gateway computer system 100 has received the file 101 from the terminal equipment 112, it sets up a session 154 with the cloud computer system 102, such as, for example, an Internet session, if the network 106 is the Internet.

Through this session 154, the gateway computer system 100 authenticates the user 114 by accessing the authentication data 118. If the authentication data 118 is, for example, a user name/password combination, this authentication data is transferred through the session 154 to the cloud computer system 102 and checked by the cloud computer system 102 for agreement with the reference data stored there. If there is such agreement, the cloud computer system 102 answers the authentication data 118 with an acknowledgment signal, through the session 154, to indicate to the gateway computer system 100 that the authentication has been successful.

In step 206, the gateway computer system 100 accesses the key 120, it being assumed here, without limitation of generality, that it is a symmetric key that is associated with the user 114. Using the key 120, the gateway computer system 100 encrypts the file 101 previously received from the terminal equipment 112 of the user 114. In step 212, the resulting encrypted file 132 is transferred through the session 154 from the gateway computer system 100 to the cloud computer system 102, and stored by the cloud computer system 102 in the memory 128. Following that, the cloud computer system 102 sends through the session 154 an acknowledgment signal 162, to indicate that the storage has been successful.

In the case of the above-mentioned embodiment with hybrid encryption, the key 120 is file-specific rather than user-specific. Because of receipt of the file 101, the gateway computer system 100 produces a file-specific symmetric key 120 for this file 101. To accomplish this, the gateway computer system 100 has a corresponding key generator to produce the file-specific symmetric key 120. The gateway computer system 100 uses this file-specific symmetric key 120 to encrypt the file 101.

In the embodiment considered here with hybrid encryption, the user 114 and also the other user 144 each have asymmetric cryptographic key pairs, to which the gateway computer system 100 has access, the respective asymmetric cryptographic key pairs being stored, for example, in the memory 116 or on chip cards of the users 114 and 146, such as, e.g., on a SIM card of the respective terminal equipment 112 or 146, or on the respective electronic identity cards of the users 114, 146.

The gateway computer system 100 now encrypts the file-specific symmetric key 120 using the public key of the user 114, producing a first ciphertext. The gateway computer system 100 then deletes the file-specific symmetric key 120 from its memory 116. In the embodiment considered here with hybrid encryption, in step 212 the resulting encrypted file 132 and the associated first ciphertext are transferred through the session 154 from the gateway computer system 100 to the cloud computer system 102, and stored by the cloud computer system 102 in the memory 128. This has the special advantage that the gateway computer system need not permanently store a copy of the file-specific symmetric key 120, which is helpful for further improving the protection of the user's privacy.

In particular, the memory 116 of the gateway computer system can store only the public key of the user 114 and the other user 144, but not the corresponding private keys, which are stored, for example, on chip cards of the user 114 or the user 144, which the terminal equipment 112 and 146 can access through corresponding interfaces.

The cloud computer system 102 has a file directory 154, such as, for example, a so-called file tree, which contains various file paths. The gateway computer system 100 can store a replica 158 of the file directory 156, from which the user 114 can select, over the protected connection 110, a file path for storing the file transferred in step 202.

After the gateway computer system 100 authenticates the user 114 by having the processor 134 execute a program module 160, this is done, for example, by the cloud computer system 102 producing a web page that displays the file directory 156. The corresponding information can be stored by the gateway computer system 100 in the form of a replica 158. In step 208, the user then first selects a file path from this replica 158 of the file directory 156, so that the gateway computer system then in step 210 issues a storage command to store the encrypted file 132 in memory 128 at the storage location specified by the file path, and sends it to the cloud computer system 102 through the session 154.

In step 212, the file directory 156 is updated by the cloud computer system, so that the encrypted file 132 appears in the updated version of the file directory 156. The replica 158 can be synchronized with the updated file directory 156 by the cloud computer system 102 sending, after the encrypted file 132 is stored in the memory 128, an acknowledgment signal through the session 154 to the gateway computer system 100, to indicate to the gateway computer system 100 that the storage command for storing the encrypted file 132 at the storage location specified by the file path has been successfully been carried out. Accordingly, the gateway computer system 100 can then also update the replica 158, so that a file path indicating the storage location of the encrypted file 132 also appears in the replica 158.

At a later point in time, the user 114 can access the encrypted file 132 again. To accomplish this, the protected connection 110 is set up once again, and also the session 154. The gateway computer system 100 then uses the authentication data 118 to authenticate the user 114 with respect to the cloud computer system, which checks the authentication data 118 for agreement with the reference data 130. After the gateway computer system 100 has successfully authenticated the user 114 with respect to the cloud computer system 102, the user 114 can select the encrypted file 132, for example from the replica 158, so that the protected connection 110 then produces a read signal to read the encrypted file 132 from the storage location indicated in the replica 158.

The cloud computer system 102 executes this read command by reading the encrypted file 132 out of the memory 128 and transferring it through the session 154 to the gateway computer system 100. The gateway computer system 100 then accesses the key 120 to decrypt the encrypted file 132 and restore the unencrypted file 101. The unencrypted file 101 is transferred over the connection 110 to the terminal equipment 112 of the user 114.

In the case of the embodiment with hybrid encryption, both the encrypted file 132 and also the first ciphertext are read out of the memory 128 and transferred through the session 154 to the gateway computer system 100. The gateway computer system 100 then initiates decryption of the first ciphertext using the private key of the user 114.

If the private key of the user 114 is present in the memory 116 of the gateway computer system 100, then this decryption can be done by the gateway computer system 100 itself. Otherwise, the gateway computer system 100 sends, for example over the connection 110, a command to the terminal equipment 112 of the user 114 to decrypt the first ciphertext, so that the terminal equipment 112 sends, for example, a chip card command to a chip card of the user 114, to which the terminal equipment 112 has access through a corresponding communications interface, so that the chip card of the user 114 decrypts the first ciphertext and sends the file-specific symmetric key 120 recovered in this way over the connection 110 to the gateway computer system 100, which then decrypts the encrypted file 132 using the file-specific symmetric key 120 recovered in this way.

For so-called file sharing with the other user 144, the user 114 can proceed as follows:

Over the connection 110, the user 114 can input an identifier of the user 144, such as, for example his e-mail address—step 300. To accomplish this, the gateway computer system 100 has a program module 164. The user 114 can select, for the user 144 designated by the identifier, a file, such as, e.g., the file 101 (step 302) and specify, for example, read privileges to this selected file 101, to which the encrypted file 132 corresponds, or also do this for multiple such files (step 304). These read privileges are stored as information 166 in the memory 116, it being specified that the user 114 has granted read privileges, through the user 144 specified by the identifier, for example to the file 101.

The gateway computer system 100 then produces, through the program module 166, a message, such as, for example, an e-mail 168, which is received by the terminal equipment 146 of the user 144—step 306. The e-mail 168 contains, for example, a link to set up a protected connection, such as, for example an https connection 170.

The user 144 sets up this connection 170 by selecting this link, for example by clicking on it with the mouse (step 308), and then the gateway computer system 100 in turn sets up the session 154, to authenticate the user 114 with respect to the cloud computer system 102 using the authentication data 118—step 310.

It is especially advantageous that no authentication or any registration is required for the user 144. On the other hand, the user 144 has access neither to the authentication data 118 nor to the key 120.

In step 312, the gateway computer system sends a read command to the cloud computer system 102 to read the encrypted file 132. This file 132 to be read can be specified in the link that the user received with the e-mail 158.

In step 314, the gateway computer system 100 receives the encrypted file 132 and then decrypts it with the key 120. Then, in step 316, the decrypted file 132, that is, the file 101, is transferred over the connection 170 to the terminal equipment 146.

In the case of hybrid encryption, read privileges, for example, to the files 101, are granted for the other user 144 by the gateway computer system 100 first reading the first ciphertext from the cloud computer system 102 and decrypting it using the private key of the user 114. The file-specific symmetric key 120 recovered in this way by the gateway computer system 100 is then encrypted using the public key of the other user 144, to obtain a second ciphertext. The gateway computer system 100 stores this second ciphertext in the cloud computer system 102 in such a way that this second ciphertext is associated with the encrypted file 132. The copy of the file-specific symmetric key 120 that is temporarily recovered by the gateway computer system 100 is then deleted again from the memory 116.

If the other user has read access, the gateway computer system 100 then receives not only the encrypted file 132 in step 314, but rather also the second ciphertext associated with the encrypted file 132. The second ciphertext is then decrypted using the private key of the other user 144, so that the gateway computer system 100 once again recovers a temporary copy of the file-specific symmetric key 120, which the gateway computer system 100 then uses to decrypt the encrypted file 132. The second ciphertext can—depending on the embodiment—either be decrypted once again directly by the gateway computer system 100, which presumes that the memory 116 contains the private key of the other user 144, or by sending the second ciphertext, for example over the connection 170, from the gateway computer system 100 to the terminal equipment 146 for decryption. In the latter case, the terminal equipment 146 answers with the decrypted second ciphertext, that is, the file-specific symmetric key 120, which the gateway computer system 100 deletes again from its memory 116 after decryption of the file 132.

Figure 4:
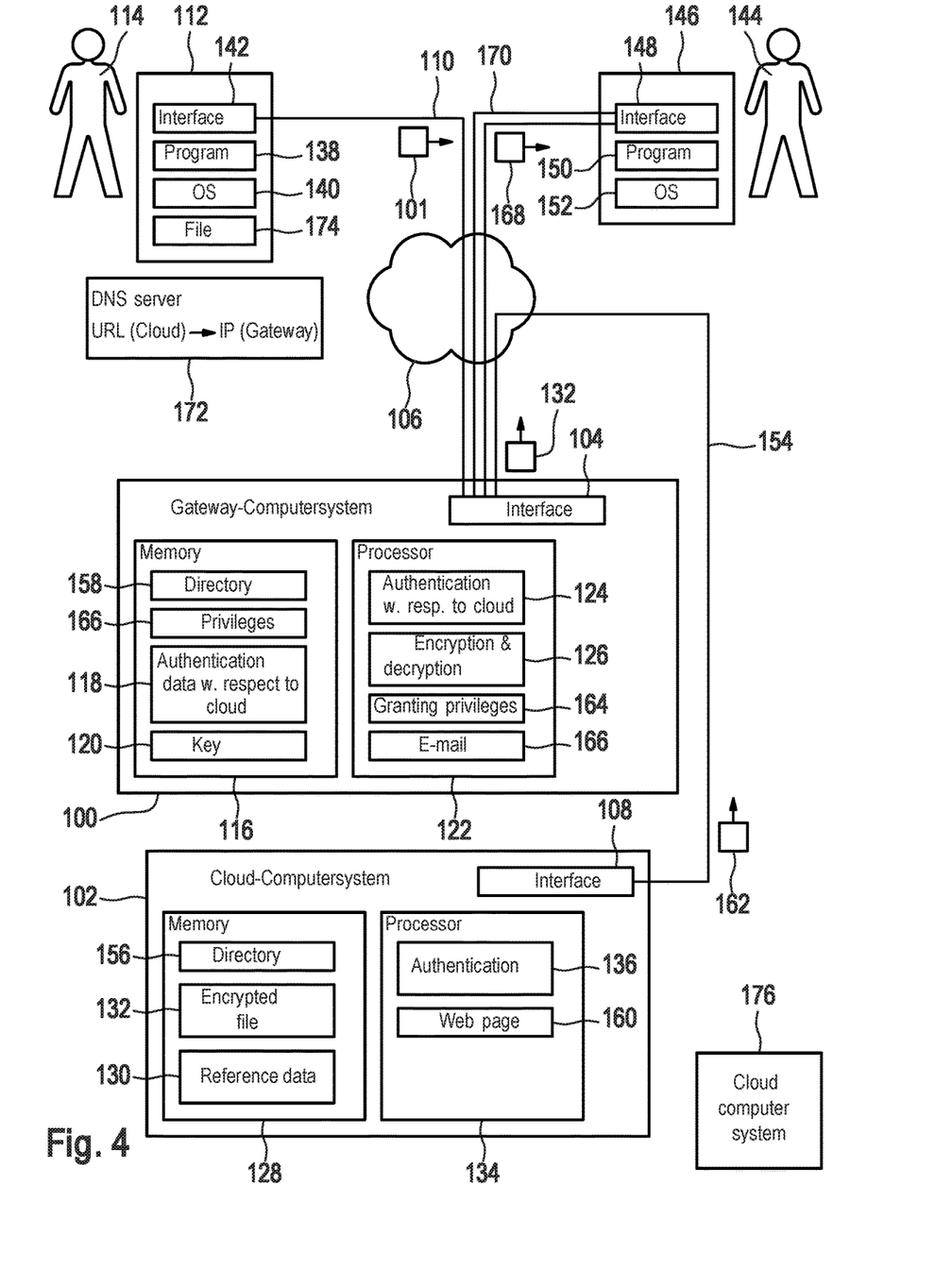
FIG. 4 A block diagram of another embodiment of an inventive computer system.

FIG. 4 shows an embodiment of the computer system, wherein the communication between the system components, that is, the gateway computer system 100, the cloud computer system 102, and the terminal equipment 112 and 146 takes place over the network 106 according to the TCP/IP protocol and the so-called name resolution is handled using so-called DNS servers.

A DNS server associates, in a manner known in the prior art, a domain name, that is, a URL with a corresponding IP address that is required to set up a connection with the participant specified by the URL in accordance with the TCP/IP protocol.

Embodiments of the invention provide that one of these DNS servers, namely DNS server 172 is indicated in the operating system 140. DNS server 172 associates the URL of the cloud computer system 102 not with the IP address of the cloud computer system 102, but rather with the IP address of the gateway computer system 100. That is, if the protected connection 110 is set up using the URL of the cloud computer system 102, then a name resolution request for the URL of the cloud computer system 102 is sent from the terminal equipment 112 over the network 106 [to] the DNS server 172 which is specified in operating system 140 and which then answers not with the IP address of the cloud computer system 102, but rather with that of the gateway computer system 100, so that accordingly the connection 110 is really set up with the gateway computer system 100, not with the cloud computer system 102. This has the advantage that the user 114 does not have to know the URL of the gateway computer system 100, but rather can work only with the URL of the cloud computer system 102, as usual. For example, the user 114 can input the URL of dropbox.com into the program module 138, for example the web browser of his terminal equipment 112, after which the connection 110 is then automatically set up with the gateway computer system 100.

It is possible to proceed in an analogous manner if the connection 110 is set up as a mobile telephony connection. In this case, an APN of the mobile telephony network can fulfill the function of the DNS server 172.

As in the embodiment shown in FIG. 1, in the embodiment shown in FIG. 4 the terminal equipment 112 can also have an association file 174 stored on it, which, in accordance with the embodiment shown in FIG. 4 that is being considered here, either contains no association of the domain in the URL of the cloud computer system 102, so that the name resolution is then handled by the DNS server 172, or has another association of a domain of an alternative cloud computer system 176 with the gateway computer system 100 or with an alternative gateway computer system 100.

In theory, the alternative cloud computer system 176 can be set up in the same way as or in a similar way to the cloud computer system 102. However, it is operated by another provider and also has a different IP address than that of the cloud computer system 102. For example, the domain in the URL of the cloud computer system 102 can be associated with the IP address of the gateway computer system 100 on the level of the DNS server 172, while the association file 174 contains an association of the domain in the URL of cloud computer system 176 with the IP address of the gateway computer system 100. This allows the user 114 to deviate from the default in the DNS server 172, and to use another cloud computer system 176 by storing a corresponding association in the association file 174.

LIST OF REFERENCE NUMBERS

100 Gateway computer system
101 File
102 Cloud computer system
104 Interface
106 Network
108 Interface
110 Protected connection
112 Terminal equipment
114 User
116 Memory
118 Authentication data
120 Key
122 Microprocessor
124 Program module
126 Program module
128 Memory
130 Reference data
132 File
134 Microprocessor
136 Program module
138 Program module
140 Operating system
142 Interface
144 User
146 Terminal equipment
148 Interface
150 Program module
152 Operating system
154 Session
156 File directory
158 Replica
160 Program
162 Acknowledgment signal
164 Program module
166 Program module
168 E-mail
170 Connection
172 DNS server
174 Association file
176 Cloud computer system

The invention claimed is:

1. A method for accessing a data storage device of a cloud computer system through a gateway computer system configured to connect with the cloud computer system over a network, the gateway computer system storing at least one cryptographic key, the at least one cryptographic key being a file-specific symmetric key, the cloud computer system being associated with a URL and the gateway computer system being associated with an IP address, the method comprising:

storing, in an association file on a first user terminal, an association of a domain contained in the URL with the IP address, the first user terminal corresponding to a user associated with an asymmetric cryptographic key pair including a public key and a private key;

creating a first protected connection between the first user terminal and the gateway computer system over the network by, inputting the URL into a program of the first user terminal, obtaining, by an operating system of the first user terminal, the IP address in response to receiving a request from the program, the request addressed to a DNS server, the request being for name resolution of the URL, the obtaining including, first accessing the association file to determine whether the association file contains an association for the domain contained in the URL, second accessing the association file to read the IP address associated with the domain contained in the URL in response to determining that the association file contains an association of the domain contained in the URL in the first accessing, transferring the IP address to the program in response to the second accessing, and setting up, by the program, the first protected connection between the first user terminal and the gateway computer system using the IP address in response to the obtaining, the setting up being performed in accordance with TCP/IP protocol;

transferring a file from the first user terminal to the gateway computer system over the first protected connection;

setting up a first session between the gateway computer system and the cloud computer system over the network;

encrypting the file by the gateway computer system using the at least one cryptographic key;

transferring the encrypted file from the gateway computer system to the cloud computer system through the first session;

encrypting, by the gateway computer system, the file-specific symmetric key using the public key of the user to generate a first ciphertext;

transferring the first ciphertext to the cloud computer system through the first session;

storing the first ciphertext in association with the encrypted file in the data storage device of the cloud computer system;

deleting the file-specific symmetric key from the gateway computer system;

inputting, by the user, an identifier of another user to the first user terminal, the other user being associated with an asymmetric cryptographic key pair including a public key and a private key;

transferring the identifier from the first user terminal to the gateway computer system over the first protected connection;

specifying, by the user over the first protected connection, access privileges for the other user corresponding to the file stored in the data storage device of the cloud computer system; and storing, by the gateway computer system, the specified access privileges in association with the identifier by, reading, by the gateway computer system, the first ciphertext from the cloud computer system, decrypting the first ciphertext using the private key of the user to obtain the file-specific symmetric key with which the file was encrypted, producing, by the gateway computer system, a second ciphertext by encrypting the file-specific symmetric key using the public key of the other user, transferring the second ciphertext from the gateway computer system to the cloud computer system, and storing the second ciphertext in association with the encrypted file in the data storage device of the cloud computer system.

2. The method according to claim 1, wherein
the gateway computer system stores authentication data of the user for authentication with respect to the cloud computer system; and
the setting up the first session includes,
accessing, by the gateway computer system, the stored authentication data of the user, and
authenticating the user using the stored authentication data of the user.

3. The method according to claim 1, wherein the cloud computer system stores a file directory for files stored in the data storage device of the cloud computer system, and the gateway computer system stores a replica of the file directory, the method further comprising:
producing, by the gateway computer system, a web page displaying the replica of the file directory;
transferring the web page to the first user terminal over the first protected connection;
displaying, by the first user terminal, the web page,
inputting at the first user terminal, a selection of a file path in the displayed web page for storage of the file;
transferring the selection of the file path over the first protected connection from the first user terminal to the gateway computer system;
transferring a storage command from the gateway computer system to the cloud computer system to store the encrypted file in the data storage device in accordance with the selection of the file path;
receiving, by the gateway computer system, an acknowledgment signal from the cloud computer system, the acknowledgment signal indicating successful execution of the storage command; and
updating the replica of the file directory in response to the receiving the acknowledgment signal.

4. The method according to claim 1, further comprising:
producing, by the gateway computer system, a message for the other user in response to the storing the specified access privileges;
transferring the message from gateway computer system to a second user terminal of the other user using the identifier; and
providing the file to the second user terminal in response to the transferring the message by,
setting up a second protected connection between the gateway computer system and the second user terminal,
setting up a second session for the other user over the network, between the gateway computer system and the cloud computer system,
authenticating, by the gateway computer system, the other user with respect to the cloud computer system by accessing, through the second session, authentication data of the other user stored in the gateway computer system,
transferring the encrypted file from the cloud computer system to the gateway computer system through the second session,
decrypting the file by the gateway computer system using the at least one cryptographic key, the at least one cryptographic key being associated with the user, and
transferring the decrypted file from the gateway computer system to the second user terminal over the second protected connection.

5. The method according to claim 1, wherein the specifying includes:
inputting, by the user, a file path in the first user terminal; and
transferring the file path over the first protected connection to the gateway computer system.

6. The method according to claim 1, wherein the first protected connection is a Virtual Private Network set up over the network.

7. The method according to claim 1, wherein the at least one cryptographic key is associated with the user.

8. The method according to claim 1, wherein the setting up the first protected connection includes an APN setting up the first protected connection with the gateway computer system over a mobile telephony connection in response to the inputting the URL.

9. A computer system, comprising:
a gateway computer system associated with an IP address, the gateway computer system including,
a first memory storing first computer-readable instructions and at least one cryptographic key, the at least one cryptographic key being a file-specific symmetric key, and
at least one first hardware processor operably coupled to the first memory, the at least one first hardware processor configured to execute the first computer-readable instructions to,
receive a file from a user terminal over a protected connection, the user terminal corresponding to a user associated with an asymmetric cryptographic key pair including a public key and a private key,
set up a first session between the gateway computer system and a cloud computer system over a network,
encrypt the file using the at least one cryptographic key,
transfer the encrypted file to the cloud computer system through the first session,
encrypt the file-specific symmetric key using the public key of the user to generate a first ciphertext,
transfer the first ciphertext to the cloud computer system through the first session,
delete the file-specific symmetric key from the gateway computer system,
receive an identifier and specified access privileges from the user terminal over the protected connection, and
store the specified access privileges in association with the identifier by,
reading the first ciphertext from the cloud computer system,
decrypting the first ciphertext using the private key of the user to obtain the file-specific symmetric key with which the file was encrypted,
producing a second ciphertext by encrypting the file-specific symmetric key using the public key of the other user, and
transferring the second ciphertext to the cloud computer system;
the cloud computer system associated with a URL, the cloud computer system including,
a second memory storing second computer-readable instructions, and
at least one second hardware processor operably coupled to the second memory, the at least one second hardware processor configured to execute the second computer-readable instructions to,
receive the encrypted file and the first ciphertext from the gateway computer system, store the encrypted file in the second memory,
store the first ciphertext in association with the encrypted file in the second memory, and
store the second ciphertext in association with the encrypted file in the second memory; and the user terminal storing an association file, the association file including an association of a domain contained in the URL with the IP address, the user terminal including,
a third memory storing a program and an operating system, and
at least one third hardware processor configured to execute the program to,
receive an input including the URL,
output a request for name resolution of the URL, the request addressed to a DNS server,
receive the IP address, and
set up the protected connection between the user terminal and the gateway computer system using the IP address, the protected connection being set up in accordance with TCP/IP protocol,
receive an input from the user including an identifier of another user, the other user being associated with an asymmetric cryptographic key pair including a public key and a private key,
transfer the identifier to the gateway computer system over the protected connection, and
specify, by the user over the protected connection, the access privileges for the other user corresponding to the file stored in the second memory, the user terminal being further configured to execute the operating system to,
obtain the IP address in response to receiving the request from the program, the IP address being obtained by,
first accessing the association file to determine whether the association file contains an association for the domain contained in the URL,
second accessing the association file to read the IP address associated with the domain contained in the URL in response to determining that the association file contains an association of the domain contained in the URL in the first accessing, and
transferring the IP address to the program in response to the second accessing.

\* \* \* \* \*